(12) United States Patent
Katsavounidis

(10) Patent No.: US 11,089,359 B1
(45) Date of Patent: Aug. 10, 2021

(54) SYSTEMS AND METHODS FOR PERSISTING IN-BAND METADATA WITHIN COMPRESSED VIDEO FILES

(71) Applicant: Facebook, Inc., Menlo Park, CA (US)

(72) Inventor: Ioannis Katsavounidis, Sane Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/740,700

(22) Filed: Jan. 13, 2020

Related U.S. Application Data

(60) Provisional application No. 62/846,732, filed on May 12, 2019.

(51) Int. Cl.
*H04N 21/4402* (2011.01)
*H04N 21/434* (2011.01)
*H04N 21/462* (2011.01)

(52) U.S. Cl.
CPC ....... *H04N 21/4402* (2013.01); *H04N 21/434* (2013.01); *H04N 21/4621* (2013.01)

(58) Field of Classification Search
CPC ............ H04N 21/4402; H04N 21/434; H04N 21/4621
See application file for complete search history.

(56) References Cited

U.S. PATENT DOCUMENTS

| | | | |
|---|---|---|---|
| 2010/0309975 A1* | 12/2010 | Zhou | H04N 19/107 375/240.03 |
| 2013/0148741 A1* | 6/2013 | Steinberg | H04N 19/40 375/240.25 |
| 2013/0195206 A1 | 8/2013 | McCarthy | |
| 2013/0293774 A1 | 11/2013 | Elliott | |
| 2016/0014418 A1* | 1/2016 | Shao | H04N 19/115 375/240.02 |

FOREIGN PATENT DOCUMENTS

EP    3 167 616 A1    5/2017

OTHER PUBLICATIONS

International Search Report and Written Opinion received for PCT Application Serial No. PCT/US2020/031531 dated Jul. 14, 2020, 13 pages.

* cited by examiner

*Primary Examiner* — Yassin Alata
(74) *Attorney, Agent, or Firm* — FisherBroyles, LLP

(57) ABSTRACT

The disclosed computer-implemented method may include (1) receiving, at a computing device, a compressed video bitstream that includes (A) video data and (B) in-band metadata that indicates a video quality of the compressed video bitstream, (2) extracting, at the computing device, the in-band metadata from the compressed video bitstream, (3) determining, based at least in part on the in-band metadata, the video quality of the compressed video bitstream, and then (4) making at least one video-processing decision in connection with the compressed video bitstream based at least in part on the video quality of the compressed video bitstream. Various other systems and methods are also disclosed.

19 Claims, 8 Drawing Sheets

SYSTEMS AND METHODS FOR PERSISTING IN-BAND METADATA WITHIN COMPRESSED VIDEO FILES

CROSS-REFERENCE TO RELATED APPLICATION

This application claims priority to and the benefit of U.S. Provisional Application No. 62/846,732, which is entitled "SYSTEMS AND METHODS FOR INCLUDING VIDEO QUALITY INFORMATION WITHIN A BITSTREAM," and was filed on May 12, 2019, the entire contents of which are incorporated herein by reference.

BRIEF DESCRIPTION OF DRAWINGS

The accompanying Drawings illustrate a number of exemplary embodiments and are parts of the specification. Together with the following description, the Drawings demonstrate and explain various principles of the instant disclosure.

Figure 1:
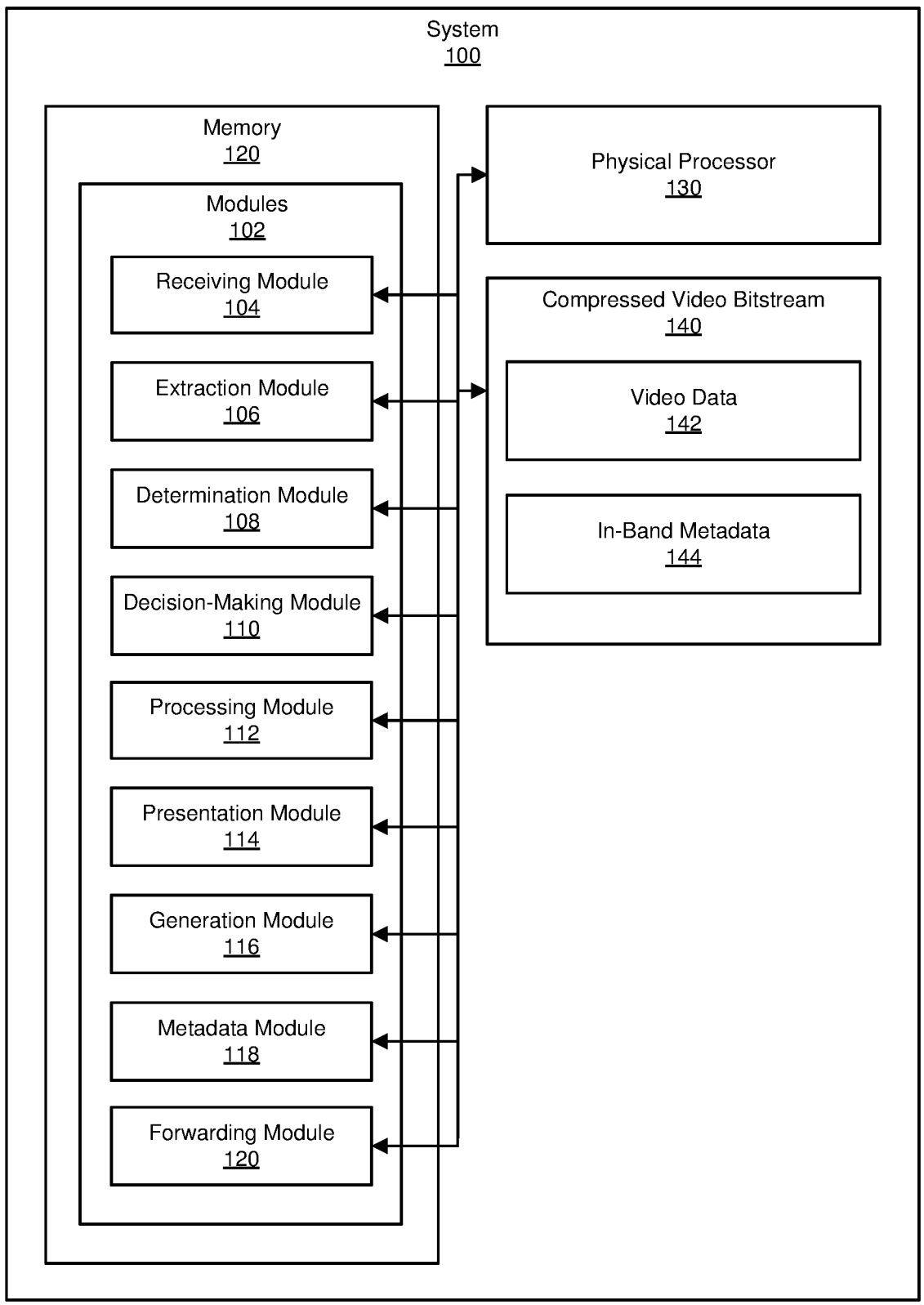
FIG. 1 is a block diagram of an exemplary system for persisting in-band metadata within compressed video files.

While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, combinations, equivalents, and alternatives falling within this disclosure.

DETAILED DESCRIPTION OF EXEMPLARY EMBODIMENTS

The present disclosure is generally directed to systems and methods for persisting in-band metadata within compressed video files. As will be explained in greater detail below, these systems and methods may provide numerous features and benefits.

Video quality metrics (also referred to as "video quality models" and/or "video quality assessment methods") are often used by major video content providers in their internal processing pipelines. Such video quality metrics may effectively drive and/or influence the encoding decisions and/or adaptive bit rate (ABR) decisions of those video content providers.

Various objective and/or subjective video quality metrics may indicate and/or describe the quality of video sequences. For example, full-reference (FR) models may determine a quality difference by comparing an original video signal against a received video signal. As an additional example, reduced reference (RR) models may extract some features of the original video signal and some features of the received video signal and may compare them to determine a quality score. Furthermore, no-reference (NR) models may assess the quality of a received video signal without reference to the original video signal.

Many video distribution and/or optimization systems may utilize such video quality metrics to improve the quality of compressed video bitstreams and/or adaptive streaming applications. Unfortunately, the traditional storage and/or transmission of such video quality metrics may have a few drawbacks and/or deficiencies. For example, traditional video processing pipelines may involve storing and/or transmitting video quality metrics out-of-band relative to the video content itself. Additionally or alternatively, such traditional video processing pipelines may involve storing and/or transmitting video quality metrics in unstandardized and/or distinct ways relative to one another. In other words, no standard method currently exists for including and/or embedding video quality information within compressed video bitstreams. The instant disclosure, therefore, identifies and addresses a need for additional and/or improved systems and methods for persisting in-band metadata within compressed video bitstreams.

In some examples, the various systems and methods described herein may receive one or more video quality metrics associated with a video object (e.g., a video bitstream, a video file, etc.). In such examples, the various systems and methods described herein may identify and/or determine the video quality metrics by inspecting and/or analyzing the video object in accordance with one or more video quality assessment techniques. In some implementations, the video quality metrics may include an FR metric, such as a peak signal-to-noise ratio (PSNR), a structural similarity (SSIM) index, a visual information fidelity (VIF) index, a detail loss metric (DLM), and so forth. In additional or alternative implementations, the video quality metrics may include an NR metric, such as a blind/referenceless image spatial quality evaluator (BRISQUE) metric, a feature maps-based referenceless image quality evaluation engine (FRIQUEE) metric, a video BLIINDS (V-BLIINDS) metric, a blockiness indicator, and so forth. In further implementations, the video quality metrics may include a scaled metric such as display resolution, an upsampling algorithm, a viewing distance, a target display type, and so forth.

In some examples, the various systems and methods described herein may perform a normative decoding operation on a compressed video bitstream. In such examples, the various systems and methods described herein may follow the normative decoding operation with a non-normative scaling operation that scales the decoded frame to a target display size. For example, a 1280×720 AVC/H.264 stream may be decoded for display on a 1920×1080 display. In this example, if the original source video input into the encoder was obtained through down-sampling of a 1920×1080 video, the various systems and methods described herein may need to evaluate and/or express video quality in terms of how the decoded video appears when presented on the 1920×1080 display. Thus, a normative decoding operation may be followed by an up-sampling operation that is device-dependent and/or non-normative.

In some examples, the video quality metrics embedded in a compressed video bitstream may include and/or represent both scaled metrics and non-scaled metrics. For example, a video quality metric as described herein may include a scaled metric with various parameters. These parameters may include, without limitation, rendered (display) resolution such as 1920×1080, an upsampling algorithm such as a Lanczos filter, a viewing distance such as a multiple of a display height (e.g., 3×H, where H is a display height), and/or a target display type (such as a television, a laptop computer display, a notepad computer display, a smartphone display, and so forth).

In some examples, a video quality metric may be associated with a portion of the video object, such as a frame, a group of pictures (GOP), a shot, a scene, a timestamp, and so forth. A level of granularity of a video quality metric embedded within a compressed video bitstream may be left open to implementers. For example, the various systems and methods described herein may encode video quality metrics at a frame level typical for PSNR, SSIM, VIF, and/or VMAF. Additionally or alternatively, the various systems and methods described herein may encode video quality metrics at a coarser temporal level, such as a GOP, a shot, a scene, or even an entire sequence level. In one example, a video quality metric evaluated over a sequence of frames may include and/or represent a Motion-tuned Video Integrity Evaluation (MOVIE) index and/or Video Quality Monitor (VQM) measurement.

In some examples, the various systems and methods described herein may generate and/or embed a video quality metric that describes a portion of a bitstream in accordance with a particular arrangement of information or syntax. Examples of this portion of the bitstream include, without limitation, a starting frame, a number of frames, and/or an aggregation type (e.g., arithmetic mean, harmonic mean, and/or percentile pooling).

In some examples, video quality metrics may each have a unique or specific range, set of ranges, set of values, set of symbols, scale, and so forth. These video quality metrics may be used to reflect, encode, and/or represent their respective results and/or values. For example, a PSNR value may vary in a range from 20 dB to 60 dB, an SSIM value may vary in a range from 0 to 1, a VMAF value may vary in a range from 0 to 100, and so forth. In order to facilitate interoperability, the various systems and methods described herein may provide and/or establish a standardized field for reporting and/or transmitting a video quality metric in an absolute categorical scale (ACR) range of 1 to 5, analogous to a Likert or Likert-type scale. In one example, the various systems and methods described herein may implement and/or obtain a mapping function for each video quality metric by performing statistical analysis of subjective scores and/or correlation with a given video quality metric. Similarly, this statistical analysis may provide and/or convey a measure of a confidence interval within the metadata.

In some examples, the various systems and methods described herein may embed video quality information that identifies and/or represents certain types of impairments of video quality within a bitstream (e.g., a video stream). Such impairments may include, without limitation, compression artifacts, scaling artifacts, geometric distortion (e.g., resulting from incorrect fitting of a video sequence to a target display), packet loss (e.g., transmission errors), frame freezing (e.g., rebuffering events), startup delay (e.g., pre-buffering), audio/video synchronization issues (e.g., lip-sync errors), and so forth.

A practical use case in video communication may include and/or represent a transformation of existing compressed video bitstreams into other formats and/or bitrates. For example, a bitstream that includes video quality information may undergo a decoding operation and a subsequent re-encoding operation. In this example, the various systems and methods described herein may track video quality information across such transcoding operations (e.g., an original encoding score and one or more subsequent generation quality scores). This video quality information may represent a history or log of video quality metrics across transcoding operations applied to the bitstream by different devices.

As a specific example, the various systems and methods described herein may embed (e.g., encode, integrate, multiplex, combine, etc.) video quality information (e.g., one or more video quality metrics) within an in-band metadata field of a bitstream that includes a video object. In this example, the in-band metadata field may represent part of a supplemental enhancement information (SEI) message within a high efficiency video coding (HEVC) stream.

In some examples, the in-band metadata field may represent part of a non-encrypted portion of a bitstream (e.g., a compressed video bitstream) that includes a video object. Examples of such an in-band metadata field include, without limitation, a video quality metric name (e.g., "SSIM"), a video quality raw score (e.g., "0.9256"), a video quality mean opinion score (MOS) (e.g., "3.89"), a 95% confidence interval (e.g., "0.1"), a scaling method (e.g., "None" for non-scaled video, "Lanczos-5" for a Lanczos scaling method, etc.), a temporal reference (e.g., "0-3" when referring to a first four frames in a sequence), an aggregation method (e.g., "Arithmetic Mean"), a generation index (e.g., "2" if there were two prior encoding steps, such as an image sensor and a first encoding generation), and so forth.

Continuing with this example, the various systems and methods described herein may access video quality information included within the bitstream and then perform one or more video operations (e.g., present the video object, transcode the video object, etc.) based on the video quality information. In this example, these systems and methods may decode the bitstream and/or present a video object included within the bitstream in accordance with the video quality information included in the bitstream. For example, these systems and methods may adjust a presentation of the video object based at least in part on the video quality information included within the bitstream. Additionally or alternatively, these systems and methods may transcode (e.g., decode and re-encode) the video object included within the video bitstream based at least in part on the embedded video quality information.

The systems and methods described herein may provide one or more advantages over traditional options for maintaining and/or utilizing video quality metrics. For example, by embedding one or more video quality metrics as in-band metadata within a compressed video bitstream, these systems and methods may be able to access and/or utilize the video quality metrics from the bitstream in connection with video management and/or transcoding applications. Furthermore, by embedding such video quality metrics in accordance with a predetermined and/or standardized in-band format and/or scheme, these systems and methods may improve the interoperability of video management and/or transcoding applications by facilitating the use of in-band video quality metrics for presenting and/or transcoding the bitstream.

The following will provide, with reference to FIGS. 1, 2, and 4-6, detailed descriptions of various systems, components, and/or implementations capable of persisting in-band metadata within compressed video files. The discussion corresponding to FIG. 3 will provide detailed descriptions of an exemplary method for persisting in-band metadata within compressed video files. The discussion corresponding to FIGS. 7 and 8 will provide detailed descriptions of exemplary formats and/or schemes for persisting in-band metadata within compressed video files.

FIG. 1 is a block diagram of an exemplary system 100 for persisting in-band metadata within compressed video files. As illustrated in this figure, exemplary system 100 may include one or more modules 102 for performing one or more tasks. As will be explained in greater detail below, modules 102 may include a receiving module 104, an extraction module 106, a determination module 108, a decision-making module 110, a processing module 112, a presentation module 114, a generation module 116, a metadata module 118, and a forwarding module 120. Although illustrated as separate elements, one or more of modules 102 in FIG. 1 may represent portions of a single module, application, and/or operating system. For example, modules 102 may represent part of and/or be included in a video encoder, a video decoder, and/or a video transcoder.

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may be stored and configured to run on one or more computing devices, such as the devices illustrated in FIG. 2 (e.g., computing device 202, computing device 208, and/or network device 206), the devices illustrated in FIG. 4 (e.g., source device 402 and/or destination device 410), the devices illustrated in FIG. 5 (e.g., network device 206), and/or the devices illustrated in FIG. 6 (e.g., computing device 202, network device 206, computing device 208, and/or computing device 610). One or more of modules 102 in FIG. 1 may also represent all or portions of one or more special-purpose computers configured to perform one or more tasks.

As illustrated in FIG. 1, exemplary system 100 may also include one or more memory devices, such as memory 122. Memory 122 generally represents any type or form of volatile or non-volatile storage device or medium capable of storing data and/or computer-readable instructions. In one example, memory 122 may store, load, and/or maintain one or more of modules 102. Examples of memory 122 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, exemplary system 100 may also include one or more physical processors, such as physical processor 130. Physical processor 130 generally represents any type or form of hardware-implemented processing device capable of interpreting and/or executing computer-readable instructions. In one example, physical processor 130 may access and/or modify one or more of modules 102 stored in memory 122. Additionally or alternatively, physical processor 130 may execute one or more of modules 102 to facilitate persisting in-band metadata within compressed video bitstreams. Examples of physical processor 130 include, without limitation, Central Processing Units (CPUs), microprocessors, microcontrollers, Field-Programmable Gate Arrays (FPGAs) that implement softcore processors, Application-Specific Integrated Circuits (ASICs), Systems on Chips (SoCs), portions of one or more of the same, variations or combinations of one or more of the same, and/or any other suitable physical processor.

As illustrated in FIG. 1, exemplary system 100 may further include a compressed video bitstream 140. In one example, compressed video bitstream 140 may include and/or represent a video file and/or stream transferred from one device to another. In this example, compressed video bitstream 140 may include and/or represent video data 142 for presentation to an end-user and/or in-band metadata 144 associated with video data 142. Additionally or alternatively, compressed video bitstream 140 may be encoded by an encoding operation and/or decoded by a decoding operation. Further, compressed video bitstream 140 may be transcoded by a transcoding operation (e.g., a combination of encoding and decoding operations).

In some examples, video data 142 may include, represent, and/or constitute a video object, such as one or more frames, pixels, groups of pictures (GOPs), shots, scenes, and so forth. Additionally or alternatively, in-band metadata 144 may be inserted and/or embedded into compressed video bitstream 140 in a way that facilitates and/or supports processing without disturbing pixel decoding.

In some examples, in-band metadata 144 may include, represent, and/or constitute one or more video quality metrics, such as FR metrics, RR metrics, and/or NR metrics. Examples of FR metrics include, without limitation, PSNRs, SSIM indexes, VIF indexes, DLMs, video multimethod assessment fusion (VMAF) values, multi-scale SSIM (MS-SSIM) indexes, motion-tuned video integrity evaluation (MOVIE) indexes, video quality metrics (VQMs), variations or combinations of one or more of the same, and/or any other suitable FR metrics. Examples of NR metrics include, without limitation, BRISQUE metrics, FRIQUEE metrics, V-BLIINDS metrics, blockiness indicators, variations or combinations of one or more of the same, and/or any other suitable NR metrics.

In some examples, in-band metadata 144 may identify and/or describe certain features of one or more devices involved in the generation, processing, and/or transmission of compressed video bitstream 140. Examples of such device-specific features include, without limitation, hardware details, camera information and/or specifics, color balance information, high/low gain information, noise reduction information, camera make/model information, camera lens information, variations or combinations of one or more of the same, and/or any other suitable device-specific features. Additionally or alternatively, in-band metadata 144 may identify and/or describe the names of quality metrics, the values of those quality metrics, and/or certain scale flags indicating whether those quality metrics are scaled or non-scaled.

Figure 2:
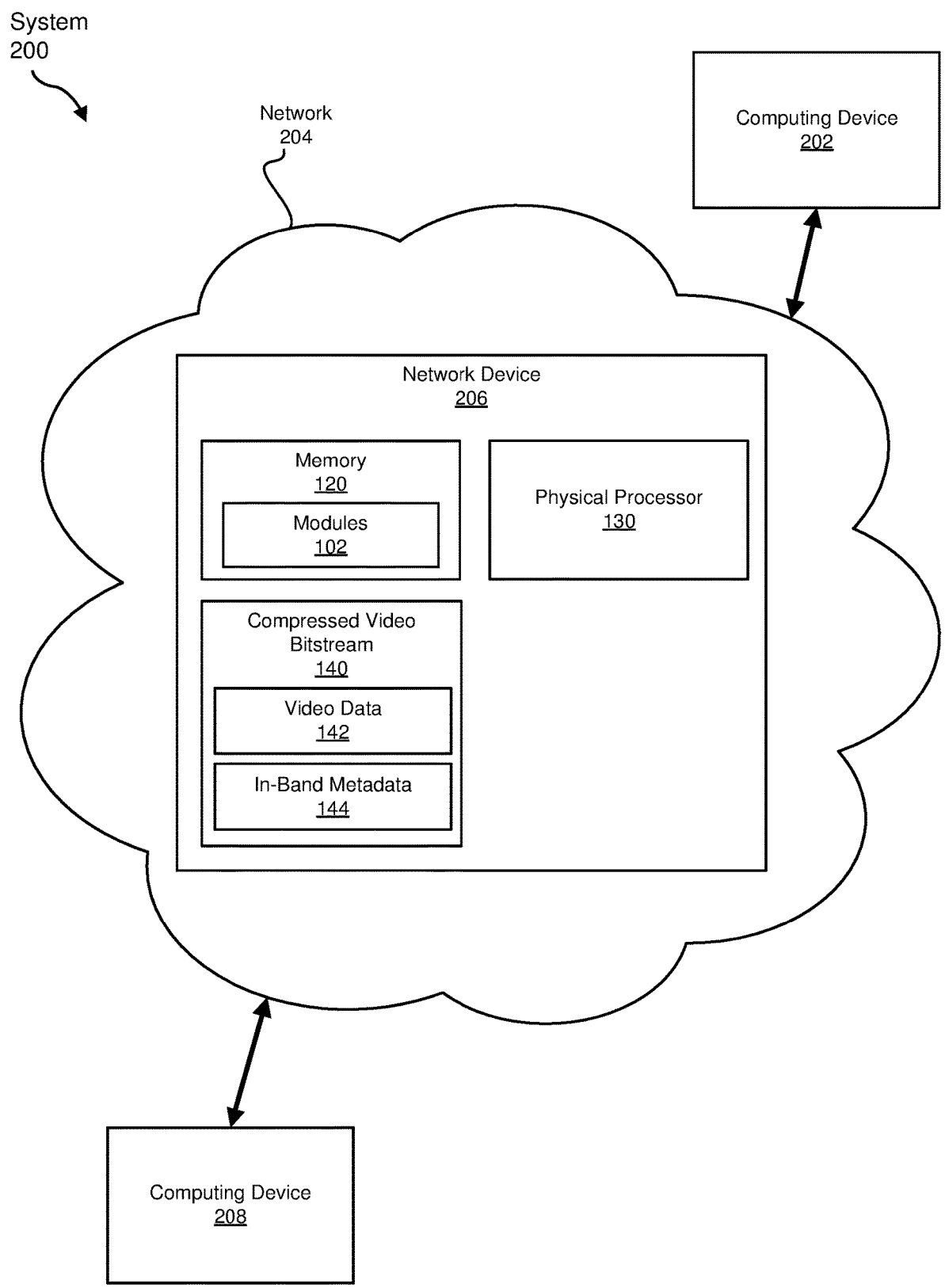
FIG. 2 is a block diagram of an additional exemplary system for persisting in-band metadata within compressed video files.

An apparatus for persisting in-band metadata within compressed video files may include all or portions of exemplary system 100. In some examples, system 100 in FIG. 1 may be implemented in a variety of ways. For example, all or a portion of exemplary system 100 may represent portions of exemplary system 200 in FIG. 2. As shown in FIG. 2, system 200 may include a network 204 that facilitates communication among network device 206, computing device 202, and/or computing device 208.

In some examples, network 204 may include and/or represent various network devices and/or nodes that form and/or establish communication paths and/or segments (although not necessarily illustrated in FIG. 2). In one example, network 204 may include network device 206 that forwards traffic between computing device 202 and computing device 208.

In some examples, and as will be described in greater detail below, one or more of modules 102 may cause computing device 202, computing device 208, and/or network device 206 to (1) receive compressed video bitstream 140 that includes (A) video data 142 and (B) in-band metadata 144 that indicates a video quality of compressed video bitstream 140, (2) extract in-band metadata 144 from compressed video bitstream 140, (3) determine, based at least in part on in-band metadata 144, the video quality of compressed video bitstream 140, and/or (4) make at least one video-processing decision in connection with compressed video bitstream 140 based at least in part on the video quality of compressed video bitstream 140.

In some examples, network device 206 and computing device 202 and 208 may each generally represent any type or form of physical computing device capable of reading computer-executable instructions. Examples of network device 206 and computing device 202 or 208 include, without limitation, routers (such as provider edge routers, hub routers, spoke routers, autonomous system boundary routers, and/or area border routers), switches, hubs, modems, bridges, repeaters, gateways (such as broadband network gateways), multiplexers, network adapters, network interfaces, client devices, laptops, tablets, desktops, servers, cellular phones, Personal Digital Assistants (PDAs), multimedia players, embedded systems, wearable devices, smartwatches, gaming consoles, head-mounted displays, artificial reality devices, variations or combinations of one or more of the same, and/or any other suitable devices.

In some examples, network 204 may generally represent any medium or architecture capable of facilitating communication or data transfer. In one example, network 204 may include one or more of computing devices 202 and 208 even though these devices are illustrated as being external to network 204 in FIG. 2. Additionally or alternatively, network 204 may include other devices that facilitate communication among network device 206 and/or computing devices 202 and 208. Network 204 may facilitate communication or data transfer using wireless and/or wired connections. Examples of network 204 include, without limitation, an intranet, an access network, a layer 2 network, a layer 3 network, a MPLS network, an Internet Protocol (IP) network, a heterogeneous network (e.g., layer 2, layer 3, IP, and/or MPLS) network, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
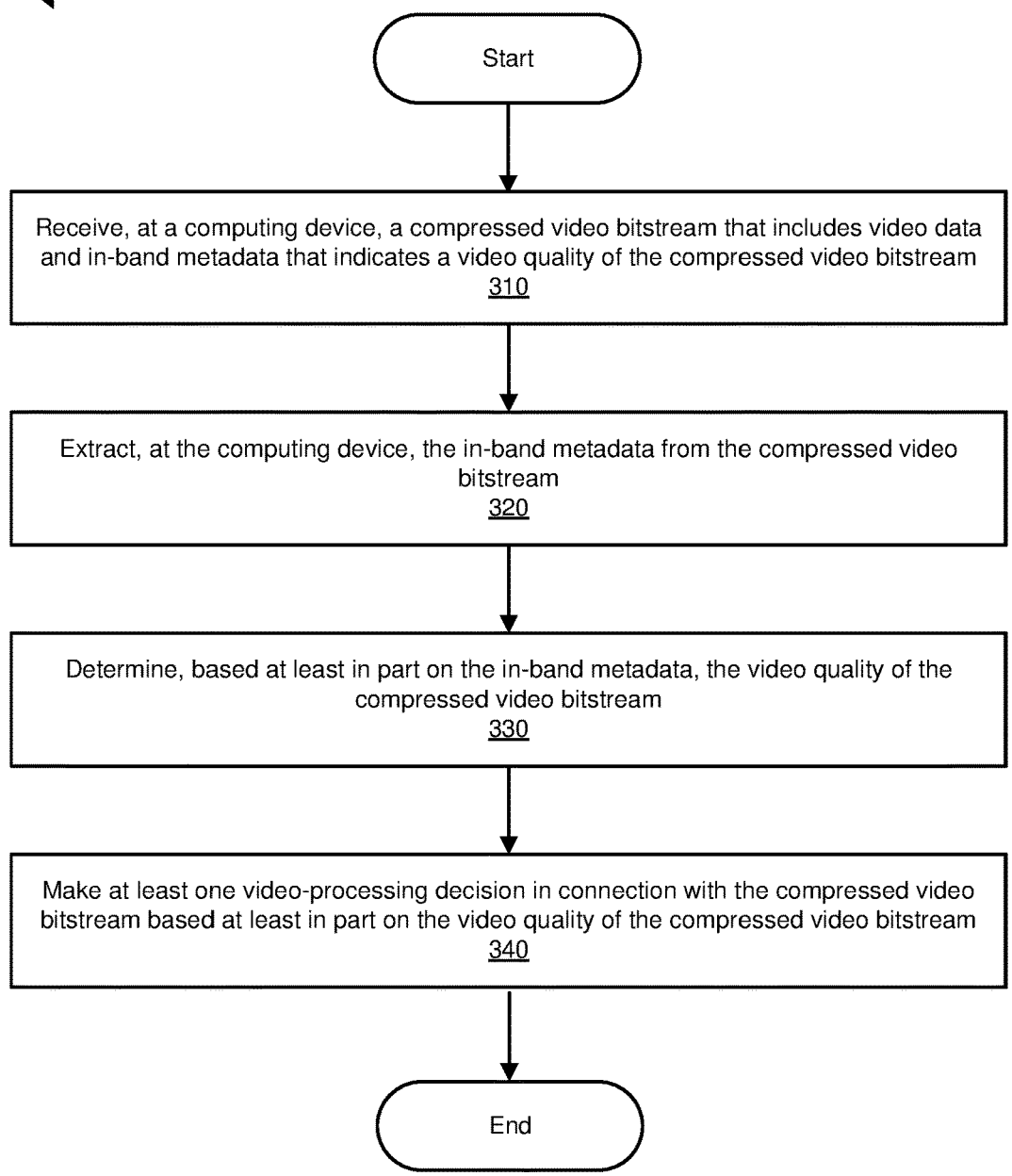
FIG. 3 is a flow diagram of an exemplary method for persisting in-band metadata within compressed video files.

FIG. 3 is a flow diagram of an exemplary computer-implemented method 300 for persisting in-band metadata within compressed video files. The steps shown in FIG. 3 may be performed by any suitable computer-executable code and/or computing system, including system 100 in FIG. 1, system 200 in FIG. 2, system 400 in FIG. 4, system 500 in FIG. 5, system 600 in FIG. 6, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may receive, at a computing device, a compressed video bitstream that includes video data and in-band metadata that indicates a video quality of the compressed video bitstream. For example, receiving module 104 may, as part of network device 206 or computing device 208 in FIG. 2, receive compressed video bitstream 140 that includes video data 142 and in-band metadata 144. In this example, video data 142 and in-band metadata 144 may be arranged and/or organized sequentially and/or consecutively within compressed video bitstream 140. Accordingly, video data 142 and in-band metadata 144 may be represented, encoded, and/or streamed as a sequence of bits (e.g., ones and zeros) transferred from one device to another.

In this example, in-band metadata 144 may include and/or represent metadata and/or signaling incorporated into the same band and/or channel as video data 142. Accordingly, in-band metadata 144 may be transferred together with video data 142 as part of the same bitstream. In contrast, out-of-band metadata may include and/or represent metadata and/or signaling transferred independent of and/or separate from the primary in-band data stream, band, and/or channel.

The systems described herein may perform step 310 in a variety of ways and/or contexts. In some examples, receiving module 104 may monitor network device 206 and/or computing device 208 for packets arriving from certain devices within network 204. For example, computing device 202 may send and/or forward compressed video bitstream 140 to network device 206 via network 204. While monitoring network device 206 in this way, receiving module 104 may detect and/or receive all or a portion of compressed video bitstream 140 upon arriving at network device 206 from computing device 202.

Returning to FIG. 3, at step 320 one or more of the systems described herein may extract, at the computing device, the in-band metadata from the compressed video bitstream. For example, extraction module 106 may, as part of network device 206 or computing device 208 in FIG. 2, extract in-band metadata 144 from compressed video bitstream 140. In one example, in-band metadata 144 may include and/or represent one or more generations of video quality metrics that indicate and/or describe certain losses and/or degradations across transcoding operations performed on compressed video bitstream 140 along its network journey.

The systems described herein may perform step 320 in a variety of ways and/or contexts. In some examples, extraction module 106 may search compressed video bitstream 140 for any in-band metadata associated with video data 142. In one example, this search may be directed and/or exclusive to the in-band data included in compressed video bitstream 140. During this search, extraction module 106 may detect and/or identify in-band metadata 144 that indicates and/or describes a video quality of video data 142. Upon doing so, extraction module 106 may extract and/or obtain in-band metadata 144 from compressed video bitstream 140.

In some examples, extraction module 106 may be configured and/or programmed to search a specific portion and/or segment of compressed video bitstream 140 for such in-band metadata. In one example, an industry standard may designate and/or reserve a specific portion or segment of compressed video bitstream 140 for such in-band metadata. For example, processing module 112 may, as part of computing device 202, may perform an encoding operation on compressed video bitstream 140. In this example, as part of the encoding operation, metadata module 118 may, as part of computing device 202, embed one or more quality metrics into compressed video bitstream 140 by prepending such quality metrics to a beginning section of compressed video bitstream 140. Alternatively, as part of the encoding operation, metadata module 118 may, as part of computing device

202, embed one or more quality metrics into compressed video bitstream 140 by appending such quality metrics to an ending section of compressed video bitstream 140.

In one example, extraction module 106 may search the portion or segment of compressed video bitstream 140 that has been designated and/or reserved for in-band metadata by the industry standard. During this search of the designated and/or reserved portion or segment of compressed video bitstream 140, extraction module 106 may locate the in-band position of compressed video bitstream 140 that has been designated and/or reserved for in-band metadata. At that position of compressed video bitstream 140, extraction module 106 may detect and/or identify in-band metadata 144. Upon doing so, extraction module 106 may extract and/or obtain in-band metadata 144 from compressed video bitstream 140.

In some examples, in-band metadata 144 may include and/or represent multiple generations of video quality metrics that indicate and/or describe the video quality of video data 142. For example, in-band metadata 144 may include and/or represent a first-generation video quality metric that indicates and/or describes the video quality of video data 142 upon being encoded for the first time. In this example, in-band metadata 144 may also include and/or represent a second-generation video quality metric that indicates and/or describes the video quality of video data 142 upon being encoded for the second time. As will be described in greater detail below, in-band metadata 144 may further include and/or represent one or more further generations of video quality metrics that indicate and/or describe the video quality of video data 142 upon being encoded subsequent to the second time.

As a specific example, generation module 116 may, as part of computing device 202, generate a first-generation quality metric that represents the video quality of video data 142 upon being encoded for the first time. In this example, metadata module 118 may, as part of computing device 202, embed and/or insert the first-generation quality metric to in-band metadata 144 included in compressed video bitstream 140. Forwarding module 120 may, as part of computing device 202, forward compressed video bitstream 140 to network device 206 via network 204.

Continuing with this example, as compressed video bitstream 140 arrives at network device 206, processing module 112 may, as part of network device 206, perform a transcoding operation on compressed video bitstream 140. In this example, the transcoding operation may involve a decoding operation that decodes video data 142 and an encoding operation that re-encodes video data 142. Another instance of generation module 116 may, as part of network device 206, generate a second-generation quality metric that represents the video quality of video data 142 upon being decoded for the first time and/or encoded for the second time. Another instance of metadata module 118 may, as part of network device 206, embed and/or insert the second-generation quality metric to in-band metadata 144 included in compressed video bitstream 140. Another instance of forwarding module 120 may, as part of network device 206, forward the transcoded version of compressed video bitstream 140 to computing device 208 via network 204.

Returning to FIG. 3, at step 330 one or more of the systems described herein may determine the video quality of the compressed video bitstream based at least in part on the in-band metadata. For example, determination module 108 may, as part of network device 206 or computing device 208 in FIG. 2, determine the video quality of compressed video bitstream 140 based at least in part on in-band metadata 144. In this example, the determined video quality may indicate and/or represent the relative quality and/or appearance of video data 142 when decoded and presented for display to an end-user.

The systems described herein may perform step 330 in a variety of ways and/or contexts. In some examples, determination module 108 may analyze, evaluate, and/or assess in-band metadata 144 associated with video data 142. For example, determination module 108 may identify multiple generations of quality metrics included in compressed video bitstream 140 with one another. Upon doing so, determination module 108 may determine the video quality of video data 142 based at least in part on this comparison.

In some examples, determination module 108 may calculate the amount of loss and/or degradation across multiple generations of quality metrics included in compressed video bitstream 140. In such examples, determination module 108 may add and/or sum up multiple generations of quality metrics included in compressed video bitstream 140 with one another. These multiple generations of quality metrics may represent a history or log of losses and/or degradations in the quality or appearance of video data 142 throughout the network journey of compressed video bitstream 140. Upon adding and/or summing up these generations of quality metrics, determination module 108 may determine the video quality of video data 142 based at least in part on the resulting sum of quality metrics.

Returning to FIG. 3, at step 340 one or more of the systems described herein may make at least one video-processing decision in connection with the compressed video bitstream based at least in part on the video quality of the compressed video bitstream. For example, decision-making module 110 may, as part of network device 206 or computing device 208 in FIG. 2, make at least one video-processing decision in connection with compressed video bitstream 140 based at least in part on the video quality of compressed video bitstream 140. In this example, the video-processing decision may be made by a major video content provider in its internal processing pipeline. Additionally or alternatively, the video-processing decision may effectively drive and/or influence the encoding and/or decoding decisions. Moreover, the video-processing decision may effectively drive and/or influence the ABR of compressed video bitstream 140.

The systems described herein may perform step 340 in a variety of ways and/or contexts. In some examples, decision-making module 110 may select at least one encoding parameter to apply as part of an encoding operation performed on video data 142 included in compressed video bitstream 140. In other examples, decision-making module 110 may select at least one decoding parameter to apply as part of a decoding operation performed on video data 142 included in compressed video bitstream 140. Additionally or alternatively, decision-making module 110 may select a certain bitrate at which the compressed video bitstream is delivered to a display device for presentation to an end-user.

In some examples, processing module 112 may, as part of network device 206 and/or computing device 208 in FIG. 2, process video data 142 included in compressed video bitstream 140 in accordance with the video-processing decision. In one example, processing module 112 may perform one or more normative video-processing operations on video data 142. In this example, such video-processing operations may be considered normative if they are device-agnostic and/or device-independent. In other words, processing module 112 may perform normative video-processing operations on compressed video bitstream 140 irrespective of the specifications, attributes, and/or parameters of the display device on which video data 142 is visually presented to an end-user.

In another example, processing module 112 may perform one or more non-normative video-processing operations on video data 142. In this example, such video-processing operations may be considered non-normative if they are device-specific and/or device-dependent. In other words, processing module 112 may perform non-normative video-processing operations on compressed video bitstream 140 according to and/or in compliance with one or more specifications, attributes, and/or parameters of the display device on which video data 142 is visually presented to an end-user.

In some examples, determination module 108 may identify one or more attributes of the display device. For example, determination module 108 may identify the resolution of the display device. In such examples, decision-making module 110 may then make the video-processing decision based at least in part on the video quality of compressed video bitstream 140 and the attributes of the display device (e.g., the resolution of the display device).

In some examples, the video-processing decision may involve the selection of a certain bitrate. In one example, processing module 112 may select an ABR at which compressed video bitstream 140 is delivered to the display device. In this example, the selection of the ABR may be based at least in part on the resolution of the display device.

In other examples, the video-processing decision may involve certain scaling operations (such as up-sampling). In one example, processing module 112 may perform a scaling operation on video data 142 included in compressed video bitstream 140. In this example, the scaling operation may effectively fit and/or conform video data 142 to the resolution of the display device.

As a specific example, processing module 112 may perform a normative operation by decoding a 1280×720 AVC/H.264 stream for visual presentation on a 1920×1080 display device. In this example, if the original source video input into the encoder was obtained through down-sampling of a 1920×1080 video, processing module 112 may scale the 1280×720 AVC/H.264 stream to fit the 1920×1080 display via up-sampling.

Figure 4:
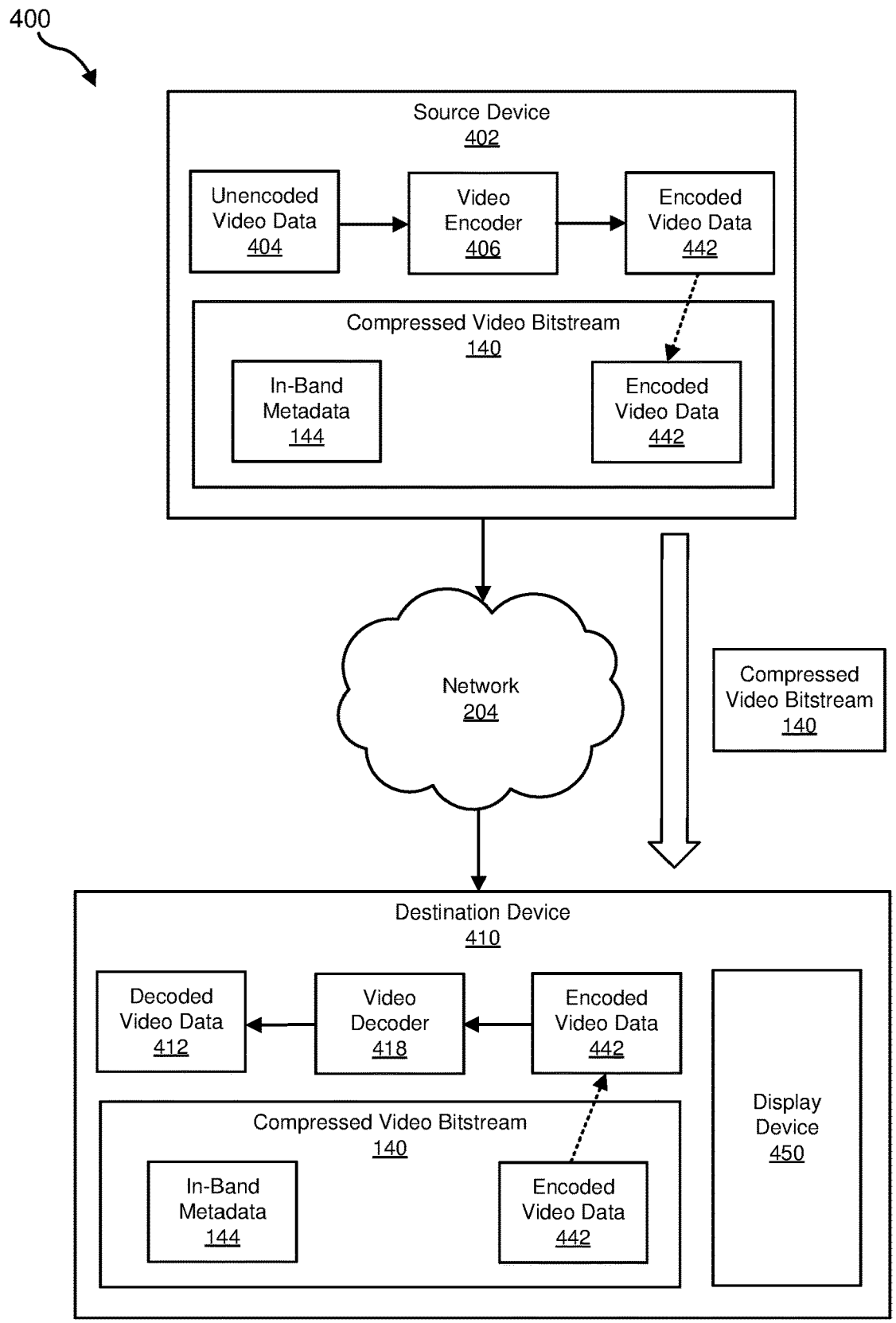
FIG. 4 is a block diagram of an additional exemplary system for persisting in-band metadata within compressed video files.

FIG. 4 illustrates an exemplary system 400 that includes and/or represents a source device 402 and a destination device 410 in communication with one another via network 204. Although not illustrated in FIG. 4, one or more of modules 102 may run on and/or be executed by source device 402 and/or destination device 410 to perform any of the tasks and/or operations described below. In one example, source device 402 may include, represent, and/or be coupled to a video camera that generates and/or produces unencoded video data 404. In this example, source device 402 may include and/or deploy a video encoder 406 that encodes and/or compresses unencoded video data 404. As a result, video encoder 406 may generate and/or produce encoded video data 442 from unencoded video data 404. Source device 402 may then generate and/or produce compressed video bitstream 140 that includes encoded video data 442 and in-band metadata 144.

As illustrated in FIG. 4, source device 402 may send and/or transfer compressed video bitstream 140 to destination device 410 via network 204. Upon receiving compressed video bitstream 140, destination device 410 may extract encoded video data 442 from compressed video bitstream 140. In one example, destination device 410 may include and/or deploy a video decoder 418 that decodes and/or decompresses encoded video data 442. As a result, video decoder 406 may generate and/or produce decoded video data 412 from encoded video data 442. In this example, destination device 410 may include, represent, and/or be coupled to a display device 450 that visually presents decoded video data 412 to an end-user.

Figure 5:
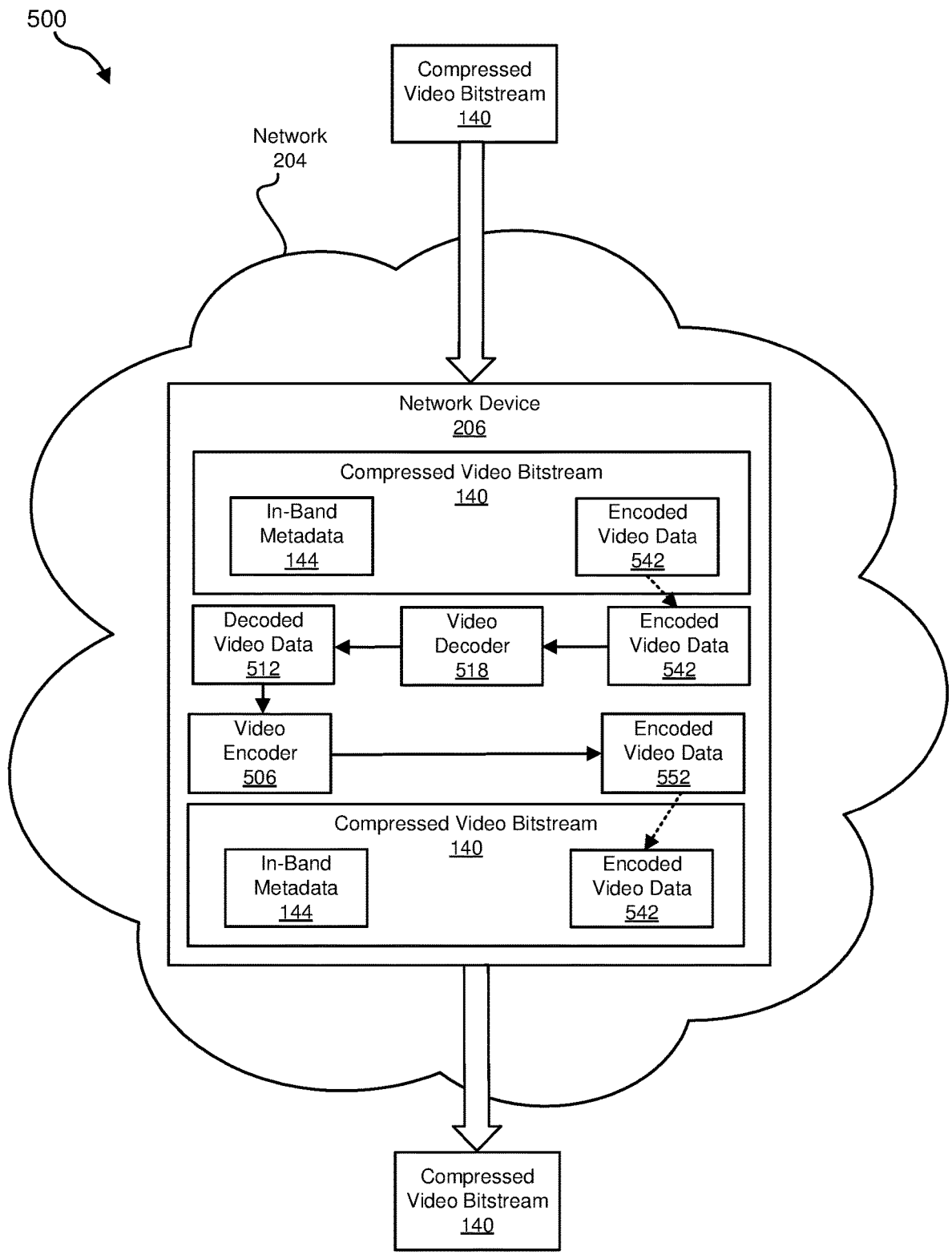
FIG. 5 is a block diagram of an additional exemplary system for persisting in-band metadata within compressed video files.

FIG. 5 illustrates an exemplary system 500 that includes and/or represents network device 206 that receives and/or forwards compressed video bitstream 140 via network 204. Although not illustrated in FIG. 5, one or more of modules 102 may run on and/or be executed by network device 206 to perform any of the tasks and/or operations described below. In one example, upon receiving compressed video bitstream 140 via network 204, network device 206 may extract encoded video data 542 from compressed video bitstream 140. In one example, network device 206 may include and/or deploy a video decoder 518 that decodes and/or decompresses encoded video data 542. As a result, video decoder 406 may generate and/or produce decoded video data 512 from encoded video data 442.

In some examples, video decoder 518 may have certain attributes and/or parameters that influence and/or dictate the video quality of decoded video data 512. In one example, these attributes and/or parameters of video decoder 518 in FIG. 5 may differ from certain attributes and/or parameters of video decoder 418 in FIG. 4. As a result, the amount of loss and/or degradation introduced to decoded video data 512 in FIG. 5 by video decoder 518 may differ from the amount of loss and/or degradation introduced to decoded video data 412 in FIG. 4 by video decoder 418.

In one example, network device 206 may include and/or deploy a video encoder 506 that encodes and/or compresses decoded video data 512. As a result, video encoder 506 may generate and/or produce encoded video data 552 from decoded video data 512. By decoding the video data and then re-encoding the video data in this way, network device 206 may effectively be performing a transcoding operation on compressed video bitstream 140. As part of this transcoding operation, network device 206 may generate and/or produce a quality metric that represents the video quality of the video data upon being encoded as part of the transcoding operation. Network device 206 may then embed and/or insert this quality metric to in-band metadata 144 included in compressed video bitstream 140. Upon embedding and/or inserting this quality metric to in-band metadata 144, network device 206 may forward compressed video bitstream 140 to an additional computing device (e.g., computing device 208 in FIG. 2 and/or destination device 410 in FIG. 4) for further processing and/or visual presentation to an end-user.

Figure 6:
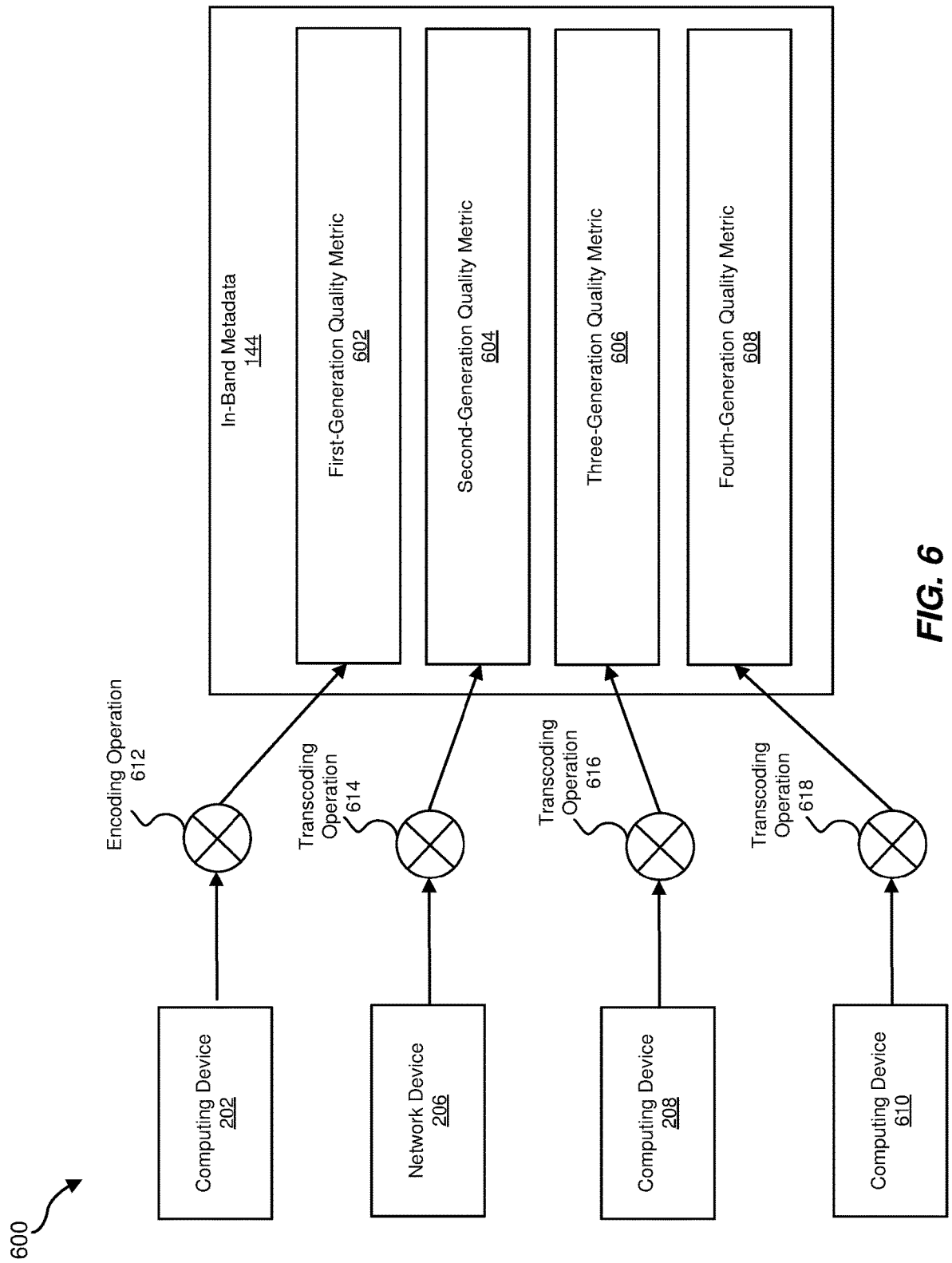
FIG. 6 is a block diagram of an additional exemplary system for persisting in-band metadata within compressed video files.

FIG. 6 illustrates an exemplary system 600 that includes and/or represents a series of computing device 202, network device 206, computing device 208, and a computing device 610 that perform certain encoding and/or transcoding operations on compressed video bitstream 140. As illustrated in FIG. 6, computing device 202 may perform an encoding operation 612 that involves and/or necessitates generating a first-generation of quality metric 602. In one example, network device 206 may subsequently perform a transcoding operation 614 that involves and/or necessitates generating a second-generation of quality metric 604. In this example, computing device 208 may later perform a transcoding operation 616 that involves and/or necessitates generating a third-generation of quality metric 606. Finally, a computing device 610 may then perform a transcoding operation 618 that involves and/or necessitates generating a fourth-generation of quality metric 608. Although not illustrated in this way in FIG. 6, exemplary system 600 may further include a destination device that decodes compressed video bitstream 140 to facilitate visually presenting the resulting video data on a display device in accordance with first-generation quality metric 602, second-generation quality metric 604, third-generation quality metric 606, and/or fourth-generation quality metric 608.

Figure 7:
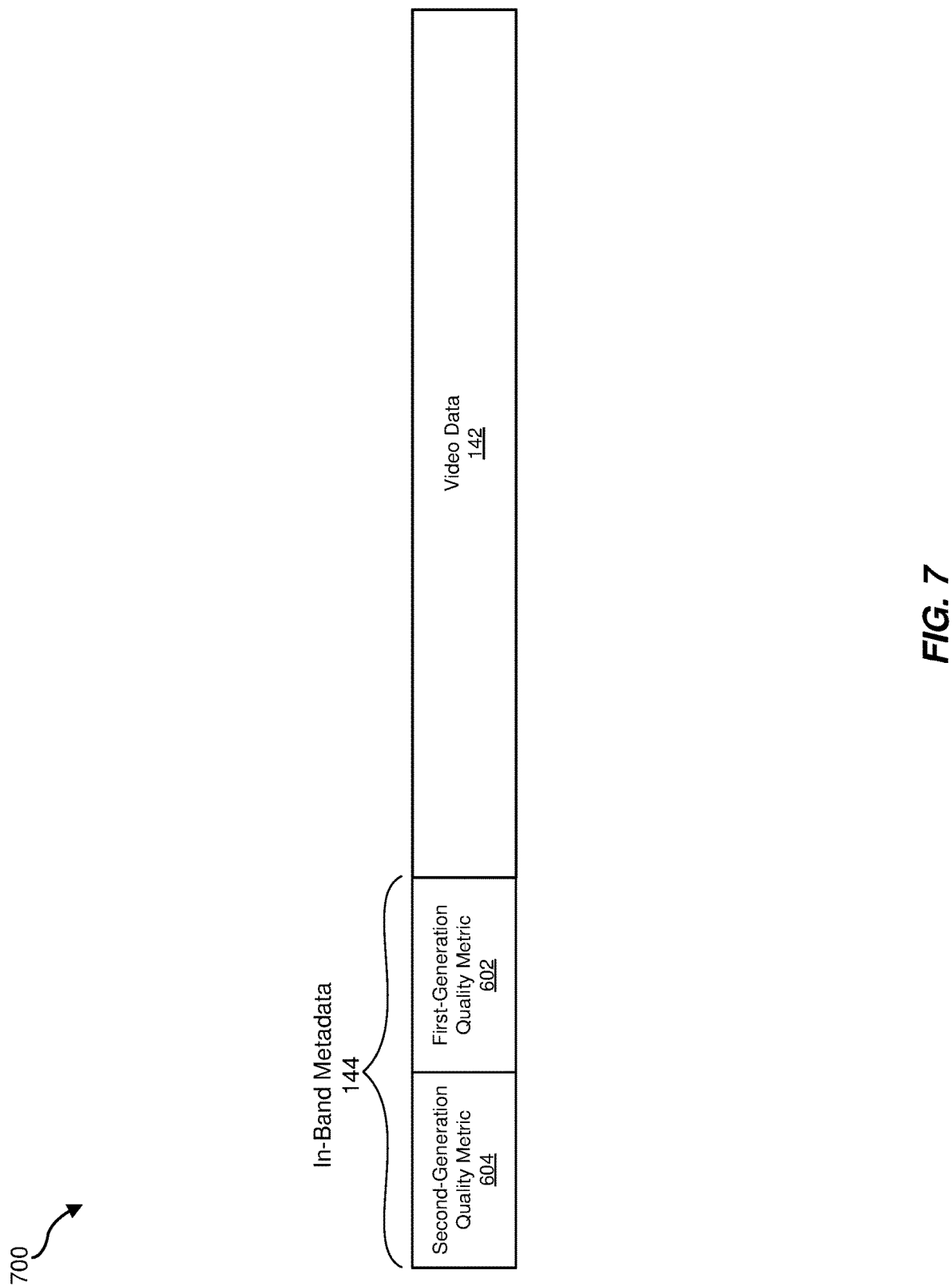
FIG. 7 is an illustration of a compressed video bitstream.

In-band metadata may be embedded in and/or applied to compressed video bitstreams in a variety of different ways and/or schemes. For example, FIG. 7 illustrates an exemplary compressed video bitstream 700 that exhibits and/or demonstrates a specific standard for arranging in-band metadata 144 and video data 142 relative to one another. As illustrated in FIG. 7, in-band metadata 144 may include and/or represent first-generation quality metric 602 and second-generation quality metric 604. In this example, in-band metadata 144 may be positioned and/or embedded in front of and/or ahead of video data 142 within compressed video bitstream 700. In other words, in-band metadata 144 may reside at a beginning and/or front position of compressed video bitstream 700 while video data 142 resides at an ending and/or back position of compressed video bitstream 700.

Figure 8:
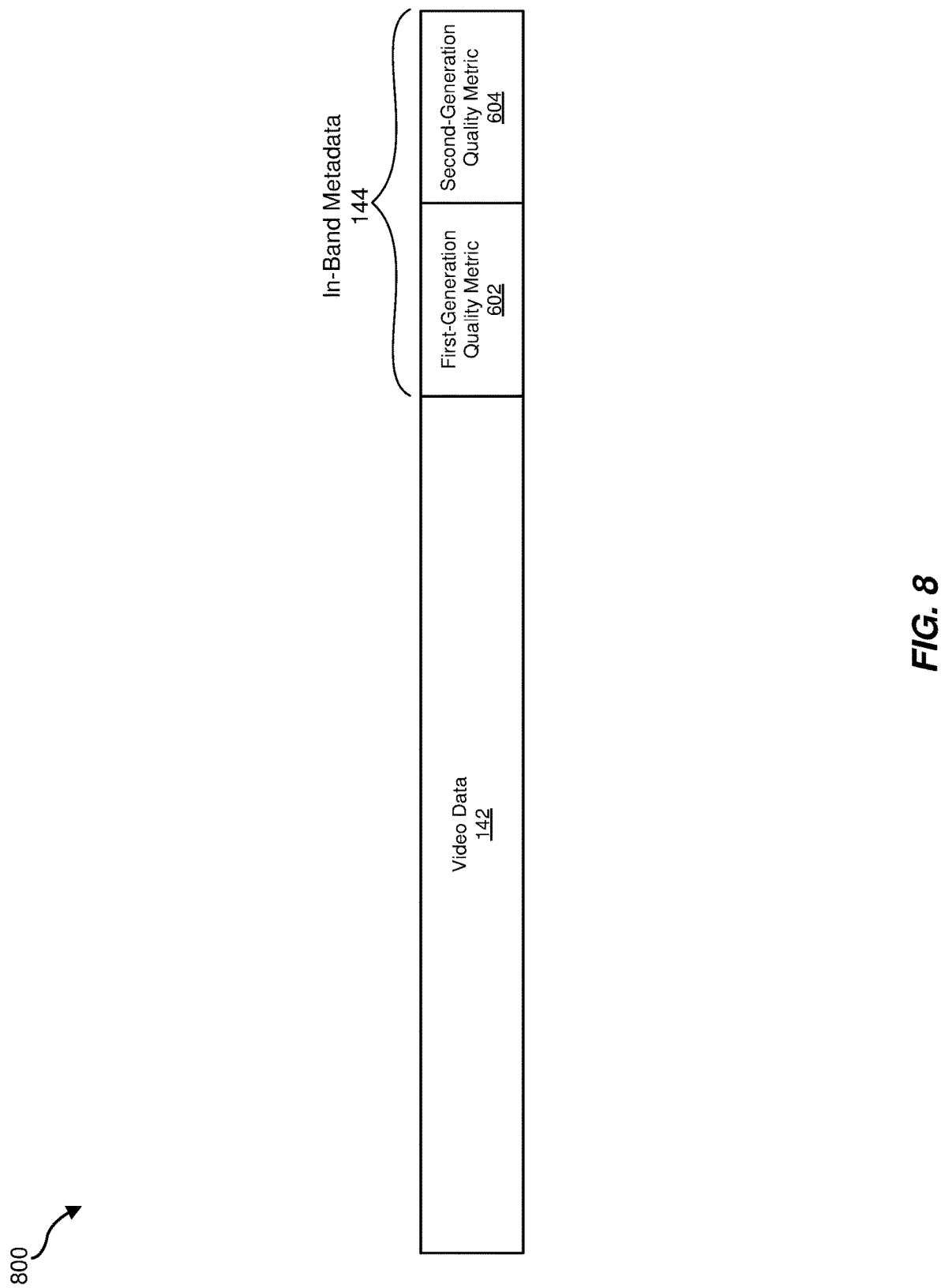
FIG. 8 is an illustration of an additional compressed video bitstream.

In another example, FIG. 8 illustrates an exemplary compressed video bitstream 800 that exhibits and/or demonstrates an additional standard for arranging in-band metadata 144 and video data 142 relative to one another. As illustrated in FIG. 8, in-band metadata 144 may include and/or represent first-generation quality metric 602 and second-generation quality metric 604. In this example, in-band metadata 144 may be positioned and/or embedded in back of and/or behind video data 142 within compressed video bitstream 800. In other words, in-band metadata 144 may reside at an ending and/or back position of compressed video bitstream 800 while video data 142 resides at a beginning and/or front position of compressed video bitstream 800.

EXAMPLE EMBODIMENTS

Example 1: A computer-implemented method comprising (1) receiving, at a computing device, a compressed video bitstream that includes (A) video data and (B) in-band metadata that indicates a video quality of the compressed video bitstream, (2) extracting, at the computing device, the in-band metadata from the compressed video bitstream, (3) determining, based at least in part on the in-band metadata, the video quality of the compressed video bitstream, and then (4) making at least one video-processing decision in connection with the compressed video bitstream based at least in part on the video quality of the compressed video bitstream.

Example 2: The computer-implemented method of Example 1, further comprising (1) processing the video data included in the compressed video bitstream in accordance with the video-processing decision and (2) providing the processed video data for visual presentation on a display device.

Example 3: The computer-implemented method of Example 1, wherein the in-band metadata comprises a first-generation quality metric that represents the video quality of the compressed video bitstream upon being encoded by a first encoding operation, and further comprising (1) performing, on the compressed video bitstream, a transcoding operation comprising (A) a decoding operation that decodes the compressed video bitstream and (B) a second encoding operation that re-encodes the compressed video bitstream, (2) producing a second-generation quality metric that represents the video quality of the compressed video bitstream upon being encoded by the second encoding operation, (3) retaining the first-generation quality metric in the in-band metadata included in the compressed video bitstream, (4) embedding the second-generation quality metric in the in-band metadata included in the compressed video bitstream, and then (5) forwarding the compressed video bitstream to an additional computing device.

Example 4: The computer-implemented method of Example 3, wherein embedding the second-generation quality metric in the in-band metadata comprises (1) locating an in-band position of the compressed video bitstream that has been designated for the in-band metadata and (2) inserting the second-generation quality metric along with the first-generation quality metric into the compressed video bitstream at the designated in-band position.

Example 5: The computer-implemented method of Example 3, wherein embedding the second-generation quality metric in the in-band metadata comprises at least one of (1) prepending the first-generation and second-generation quality metrics to a beginning of the compressed video bitstream or appending the first-generation and second-generation quality metrics to an ending of the compressed video bitstream.

Example 6: The computer-implemented method of Example 1, wherein the video-processing decision comprises at least one of (1) selecting at least one encoding parameter to apply as part of an encoding operation performed on the video data included in the compressed video bitstream, (2) selecting at least one decoding parameter to apply as part of a decoding operation performed on the video data included in the compressed video bitstream, or (3) selecting a certain bitrate at which the compressed video bitstream is delivered to a display device.

Example 7: The computer-implemented method of Example 1, wherein extracting the in-band metadata from the compressed video bitstream comprises (1) searching a designated portion of the compressed video bitstream for the in-band metadata and, during the search, (2) identifying the in-band metadata at the designated portion of the compressed video bitstream.

Example 8: The computer-implemented method of Example 1, further comprising identifying at least one attribute of a display device associated with the computing device, and wherein making the video-processing decision in connection with the compressed video bitstream comprises making the video-processing decision based at least in part on the video quality of the compressed video bitstream and the attribute of the display device.

Example 9: The computer-implemented method of Example 8, wherein (1) the attribute of the display device comprises a resolution of the display device, and (2) the video-processing decision comprises selecting a certain bitrate at which the compressed video bitstream is delivered to the display device based at least in part on the resolution of the display device.

Example 10: The computer-implemented method of Example 8, wherein (1) the attribute of the display device comprises a resolution of the display device, and (2) the video-processing decision comprises performing, in response to identifying the resolution of the display device, a scaling operation on the video data included in the compressed video bitstream to conform the video data to the resolution of the display device.

Example 11: The computer-implemented method of Example 1, further comprising identifying, within the in-band metadata, multiple generations of quality metrics that represent the video quality of the compressed video bitstream after undergoing different encoding or decoding operations, and wherein determining the video quality of the compressed video bitstream comprises (1) calculating an amount of degradation across the multiple generations of quality metrics and (2) determining, based at least in part on the amount of degradation across the multiple generations of quality metrics, the video quality of the compressed video bitstream.

Example 12: The computer-implemented method of Example 1, further comprising identifying, within the in-band metadata, multiple generations of quality metrics that represent the video quality of the compressed video bitstream after undergoing different encoding or decoding operations, and wherein determining the video quality of the compressed video bitstream comprises (1) comparing the multiple generations of quality metrics with one another and (2) determining, based at least in part on the comparison, the video quality of the compressed video bitstream.

Example 13: The computer-implemented method of Example 1, wherein the in-band metadata further indicates an impairment of the compressed video bitstream, and further comprising identifying, within the in-band metadata, the impairment of the compressed video bitstream, and wherein making the video-processing decision in connection with the compressed video bitstream comprises making the video-processing decision based at least in part on the video quality of the compressed video bitstream and the impairment of the compressed video bitstream.

Example 14: The computer-implemented method of Example 1, wherein the in-band metadata comprises at least one of (1) a name of a quality metric, (2) a value of the quality metric, or (3) a scale flag that indicates whether the quality metric is scaled or non-scaled.

Example 15: The computer-implemented method of Example 1, wherein the in-band metadata comprises at least one of (1) a peak signal-to-noise ratio (PSNR) of the compressed video bitstream, (2) a structural similarity (SSIM) index of the compressed video bitstream, (3) a variance inflation factor (VIF) of the compressed video bitstream, (4) a detail loss metric (DLM) of the compressed video bitstream, (5) a video multimethod assessment fusion (VMAF) value of the compressed video bitstream, (6) a multi-scale SSIM (MS-SSIM) index of the compressed video bitstream, (7) a motion-tuned video integrity evaluation (MOVIE) index of the compressed video bitstream, (8) a video quality metric (VQM) of the compressed video bitstream, (9) a blind/referenceless image spatial quality evaluator (BRISQUE) value of the compressed video bitstream, (10) a feature maps based referenceless image quality evaluation engine (FRIQUEE) value of the compressed video bitstream, or (11) a blockiness indicator of the compressed video bitstream.

Example 16: A system comprising (1) a receiving module, stored in memory, that receives a compressed video bitstream that includes (A) video data and (B) in-band metadata that indicates a video quality of the compressed video bitstream, (2) an extraction module, stored in memory, that extracts the in-band metadata from the compressed video bitstream, (3) a determination module, stored in memory, that determines, based at least in part on the in-band metadata, the video quality of the compressed video bitstream, (4) a decision-making module, stored in memory, that makes at least one video-processing decision in connection with the compressed video bitstream based at least in part on the video quality of the compressed video bitstream, and (5) at least one physical processor configured to execute the receiving module, the extraction module, the determination module, and the decision-making module.

Example 17: The system of Example 16, further comprising (1) a processing module, stored in memory, that processes the video data included in the compressed video bitstream in accordance with the video-processing decision and (2) a presentation module, stored in memory, that providing the processed video data for visual presentation on a display device, and wherein the physical processor is further configured to execute the processing module and the presentation module.

Example 18: The system of Example 16, wherein the in-band metadata comprises a first-generation quality metric that represents the video quality of the compressed video bitstream upon being encoded by a first encoding operation, and further comprising (1) a processing module, stored in memory, that performs, on the compressed video bitstream, a transcoding operation comprising (A) a decoding operation that decodes the compressed video bitstream and (B) a second encoding operation that re-encodes the compressed video bitstream, (2) a generation module, stored in memory, that produces a second-generation quality metric that represents the video quality of the compressed video bitstream upon being encoded by the second encoding operation, (3) a metadata module, stored in memory, that (A) retains the first-generation quality metric in the in-band metadata included in the compressed video bitstream and (B) embeds the second-generation quality metric in the in-band metadata included in the compressed video bitstream, and (4) a forwarding module, stored in memory, that forwards the compressed video bitstream to an additional computing device.

Example 19: The system of Example 16, wherein, to embed the second-generation quality metric in the in-band metadata, the metadata module (1) locates an in-band position of the compressed video bitstream that has been designated for the in-band metadata and (2) inserts the second-generation quality metric along with the first-generation quality metric into the compressed video bitstream at the designated in-band position.

Example 20: A non-transitory, computer-readable medium comprising computer-readable instructions that, when executed by at least one processor of a computing device, cause the computing device to (1) receive a compressed video bitstream that includes (A) video data and (B) in-band metadata that indicates a video quality of the compressed video bitstream, (2) extract the in-band metadata from the compressed video bitstream, (3) determine, based at least in part on the in-band metadata, the video quality of the compressed video bitstream, and then (4) make at least one video-processing decision in connection with the compressed video bitstream based at least in part on the video quality of the compressed video bitstream.

In certain embodiments, one or more of the modules described herein may transform data, physical devices, and/or representations of physical devices from one form to another. For example, one or more of the modules recited herein may receive, at a computing device, a compressed video bitstream that includes video data and in-band metadata that indicates a video quality of the compressed video bitstream and perform a decoding and/or transcoding operation on the compressed video bitstream such that the video data is transformed from an encoded version to a decoded version. Additionally or alternatively, one or more of the modules described herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    receiving, at a computing device, a compressed video bitstream that includes:
        video data; and
        in-band metadata that indicates a video quality of the compressed video bitstream;
    extracting, at the computing device, the in-band metadata from the compressed video bitstream, wherein the in-band metadata comprises a first-generation quality metric that represents the video quality of the compressed video bitstream upon being encoded by a first encoding operation;
    performing, on the compressed video bitstream, a transcoding operation comprising:
        a decoding operation that decodes the compressed video bitstream; and
        a second encoding operation that re-encodes the compressed video bitstream;
    producing a second-generation quality metric that represents the video quality of the compressed video bitstream upon being encoded by the second encoding operation;
    retaining the first-generation quality metric in the in-band metadata included in the compressed video bitstream;
    embedding the second-generation quality metric in the in-band metadata by prepending the first-generation and second-generation quality metrics to a beginning of the compressed video bitstream;
    determining, based at least in part on the in-band metadata, the video quality of the compressed video bitstream; and
    making at least one video-processing decision in connection with the compressed video bitstream based at least in part on the video quality of the compressed video bitstream.

2. The computer-implemented method of claim 1, further comprising:
    processing the video data included in the compressed video bitstream in accordance with the video-processing decision; and
    providing the processed video data for visual presentation on a display device.

3. The computer-implemented method of claim 1,
    further comprising forwarding the compressed video bitstream to an additional computing device.

4. The computer-implemented method of claim 1, wherein embedding the second-generation quality metric in the in-band metadata comprises:
    locating an in-band position of the compressed video bitstream that has been designated for the in-band metadata; and
    inserting the second-generation quality metric along with the first-generation quality metric into the compressed video bitstream at the designated in-band position.

5. The computer-implemented method of claim 1, wherein the video-processing decision comprises at least one of:
    selecting at least one encoding parameter to apply as part of an encoding operation performed on the video data included in the compressed video bitstream;
    selecting at least one decoding parameter to apply as part of a decoding operation performed on the video data included in the compressed video bitstream; or selecting a certain bitrate at which the compressed video bitstream is delivered to a display device.

6. The computer-implemented method of claim 1, wherein extracting the in-band metadata from the compressed video bitstream comprises:
searching a designated portion of the compressed video bitstream for the in-band metadata; and
during the search, identifying the in-band metadata at the designated portion of the compressed video bitstream.

7. The computer-implemented method of claim 1, further comprising identifying at least one attribute of a display device associated with the computing device; and
wherein making the video-processing decision in connection with the compressed video bitstream comprises making the video-processing decision based at least in part on the video quality of the compressed video bitstream and the attribute of the display device.

8. The computer-implemented method of claim 7, wherein:
the attribute of the display device comprises a resolution of the display device; and
the video-processing decision comprises selecting a certain bitrate at which the compressed video bitstream is delivered to the display device based at least in part on the resolution of the display device.

9. The computer-implemented method of claim 7, wherein:
the attribute of the display device comprises a resolution of the display device; and
the video-processing decision comprises performing, in response to identifying the resolution of the display device, a scaling operation on the video data included in the compressed video bitstream to conform the video data to the resolution of the display device.

10. The computer-implemented method of claim 1, further comprising identifying, within the in-band metadata, multiple generations of quality metrics that represent the video quality of the compressed video bitstream after undergoing different encoding or decoding operations; and
wherein determining the video quality of the compressed video bitstream comprises:
calculating an amount of degradation across the multiple generations of quality metrics; and
determining, based at least in part on the amount of degradation across the multiple generations of quality metrics, the video quality of the compressed video bitstream.

11. The computer-implemented method of claim 1, further comprising identifying, within the in-band metadata, multiple generations of quality metrics that represent the video quality of the compressed video bitstream after undergoing different encoding or decoding operations; and
wherein determining the video quality of the compressed video bitstream comprises:
comparing the multiple generations of quality metrics with one another; and
determining, based at least in part on the comparison, the video quality of the compressed video bitstream.

12. The computer-implemented method of claim 1, wherein the in-band metadata further indicates an impairment of the compressed video bitstream;
further comprising identifying, within the in-band metadata, the impairment of the compressed video bitstream; and
wherein making the video-processing decision in connection with the compressed video bitstream comprises making the video-processing decision based at least in part on the video quality of the compressed video bitstream and the impairment of the compressed video bitstream.

13. The computer-implemented method of claim 1, wherein the in-band metadata comprises at least one of:
a name of a quality metric;
a value of the quality metric; or
a scale flag that indicates whether the quality metric is scaled or non-scaled.

14. The computer-implemented method of claim 1, wherein the in-band metadata comprises at least one of:
a peak signal-to-noise ratio (PSNR) of the compressed video bitstream;
a structural similarity (SSIM) index of the compressed video bitstream;
a variance inflation factor (VIF) of the compressed video bitstream;
a detail loss metric (DLM) of the compressed video bitstream;
a video multimethod assessment fusion (VMAF) value of the compressed video bitstream;
a multi-scale SSIM (MS-SSIM) index of the compressed video bitstream;
a motion-tuned video integrity evaluation (MOVIE) index of the compressed video bitstream;
a video quality metric (VQM) of the compressed video bitstream;
a blind/referenceless image spatial quality evaluator (BRISQUE) value of the compressed video bitstream;
a feature maps based referenceless image quality evaluation engine (FRIQUEE) value of the compressed video bitstream; or
a blockiness indicator of the compressed video bitstream.

15. A system comprising:
a receiving module, stored in memory, that receives a compressed video bitstream that includes:
video data; and
in-band metadata that indicates a video quality of the compressed video bitstream;
an extraction module, stored in memory, that extracts the in-band metadata from the compressed video bitstream, wherein the in-band metadata comprises a first-generation quality metric that represents the video quality of the compressed video bitstream upon being encoded by a first encoding operation;
a processing module, stored in memory, that performs, on the compressed video bitstream, a transcoding operation comprising:
a decoding operation that decodes the compressed video bitstream; and
a second encoding operation that re-encodes the compressed video bitstream;
a generation module, stored in memory, that produces a second-generation quality metric that represents the video quality of the compressed video bitstream upon being encoded by the second encoding operation;
a metadata module, stored in memory, that:
retains the first-generation quality metric in the in-band metadata included in the compressed video bitstream; and
embeds the second-generation quality metric in the in-band metadata by prepending the first-generation and second-generation quality metrics to a beginning of the compressed video bitstream;
a determination module, stored in memory, that determines, based at least in part on the in-band metadata, the video quality of the compressed video bitstream;

a decision-making module, stored in memory, that makes at least one video-processing decision in connection with the compressed video bitstream based at least in part on the video quality of the compressed video bitstream; and at least one physical processor configured to execute the receiving module, the extraction module, the processing module, the generation module, the metadata module, the determination module, and the decision-making module.

16. The system of claim 15, wherein the processing module processes the video data included in the compressed video bitstream in accordance with the video-processing decision; and further comprising a presentation module, stored in memory, that providing the processed video data for visual presentation on a display device; and wherein the physical processor is further configured to execute the processing module and the presentation module.

17. The system of claim 15, further comprising a forwarding module, stored in memory, that forwards the compressed video bitstream to an additional computing device.

18. The system of claim 15, wherein, to embed the second-generation quality metric in the in-band metadata, the metadata module:

locates an in-band position of the compressed video bitstream that has been designated for the in-band metadata; and inserts the second-generation quality metric along with the first-generation quality metric into the compressed video bitstream at the designated in-band position.

19. A non-transitory, computer-readable medium comprising computer-readable instructions that, when executed by at least one processor of a computing device, cause the computing device to:

receive a compressed video bitstream that includes:
video data; and
in-band metadata that indicates a video quality of the compressed video bitstream;

extract the in-band metadata from the compressed video bitstream, wherein the in-band metadata comprises a first-generation quality metric that represents the video quality of the compressed video bitstream upon being encoded by a first encoding operation;

perform, on the compressed video bitstream, a transcoding operation comprising:
a decoding operation that decodes the compressed video bitstream; and
a second encoding operation that re-encodes the compressed video bitstream;

produce a second-generation quality metric that represents the video quality of the compressed video bitstream upon being encoded by the second encoding operation;

retain the first-generation quality metric in the in-band metadata included in the compressed video bitstream;

embed the second-generation quality metric in the in-band metadata by prepending the first-generation and second-generation quality metrics to a beginning of the compressed video bitstream;

determine, based at least in part on the in-band metadata, the video quality of the compressed video bitstream; and make at least one video-processing decision in connection with the compressed video bitstream based at least in part on the video quality of the compressed video bitstream.

* * * * *